Aug. 18, 1942.     E. R. BARRETT     2,293,486
UNLOADING CONVEYER
Filed Jan. 9, 1941     2 Sheets-Sheet 1

INVENTOR
Edward R. Barrett
BY
Harness, Dickey & Pierce
ATTORNEYS.

Aug. 18, 1942.  E. R. BARRETT  2,293,486
UNLOADING CONVEYER
Filed Jan. 9, 1941   2 Sheets-Sheet 2
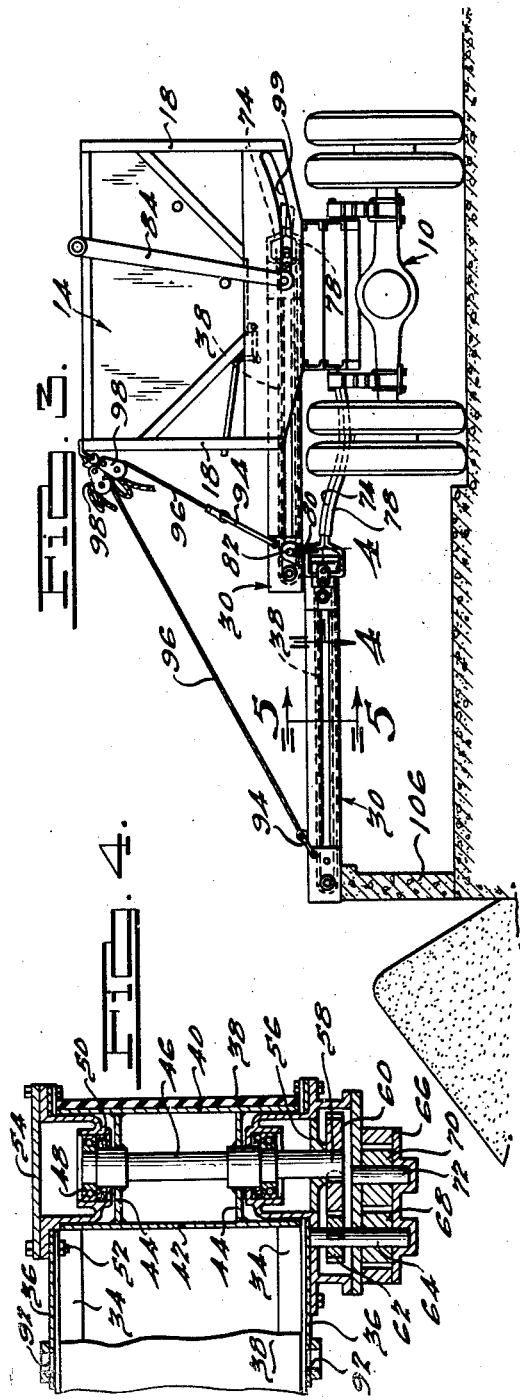
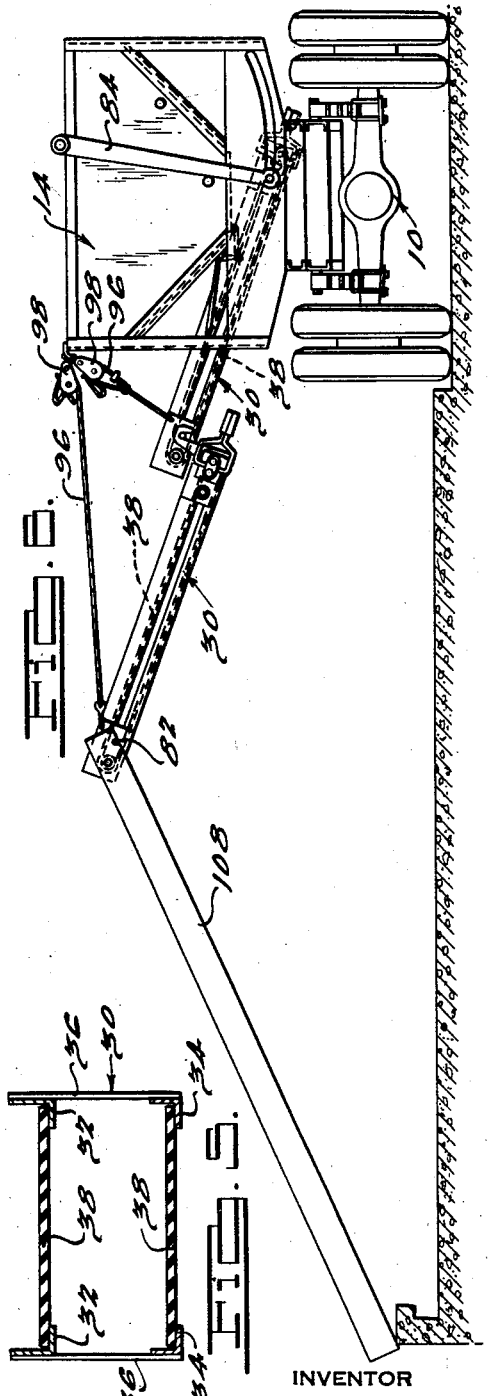
INVENTOR
Edward R. Barrett
BY
Harness, Dickey & Pierce
ATTORNEYS.

Patented Aug. 18, 1942

2,293,486

UNITED STATES PATENT OFFICE 2,293,486

UNLOADING CONVEYER

Edward R. Barrett, Detroit, Mich., assignor to Gar Wood Industries, Inc., Detroit, Mich., a corporation of Michigan Application January 9, 1941, Serial No. 373,761

8 Claims. (Cl. 214—83)

The present invention relates to conveying mechanism, and particularly relates to power belt delivery conveyers used on vehicle hopper bodies.

One of the primary objects of the present invention is to provide a simple power conveyer mechanism mounted on a vehicle hopper body so that the contents of such body may be rapidly discharged therefrom.

Another object of the present invention is to provide an improved discharge mechanism for vehicle hopper bodies which has a wider range of utility than the high lift dump bodies now in use and by which a substantial portion of the dead weight of the hoist mechanism now used in such dump bodies is reclaimed for pay load.

Another object of the present invention is to provide a power conveyer mechanism which may be easily rigged on conventional vehicle hopper bodies.

Other objects of the invention will become apparent from the following specification, the drawings relating thereto, and from the claims hereinafter set forth.

In the drawings, in which like numerals are used to designate like parts:

Fig. 3 is a rear elevational view illustrating one arrangement of the conveyer means;

Fig. 4 is a fragmentary cross-sectional view taken substantially along the line 4—4 of Fig. 3;

Fig. 5 is a cross-sectional view taken substantially along the line 5—5 of Fig. 3; and Fig. 6 is a view similar to that illustrated in Fig. 3, illustrating another use and arrangement of elements of the construction of the present invention.

Figure 2:
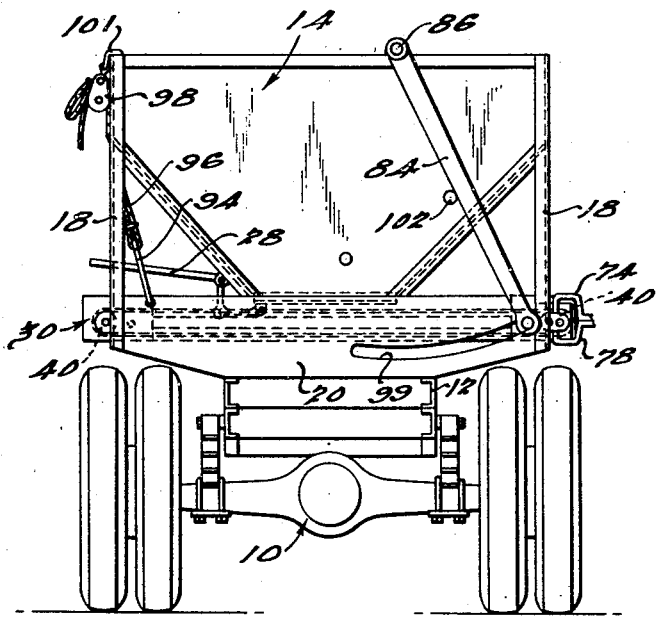
Fig. 2 is a rear elevational view of the structure shown in Fig. 1.

Referring to the drawings, the rear end of an automotive truck is generally indicated at 10, and such truck includes a conventional chassis 12 having a hopper body generally indicated at 14 mounted thereon. Such dump body 14 includes side wall members 16 which slope downwardly and inwardly toward the longitudinal center of the vehicle, as best shown in Fig. 2. The body members are mounted upon vertical frame members 18 which are in turn fixedly secured to transversely extending frame members 20 which are in the form of plates and disposed adjacent the ends of the body. Such plate members rest upon the chassis 12 and are secured thereto.

The body also includes the usual end walls and it is divided longitudinally into a plurality of separate compartments or hoppers by means of transversely extending wall members 22. Each of such hoppers is provided with a discharge opening in the bottom thereof which is spaced upwardly from the chassis 12 and which is closed by means of a slide gate 24. Such slide gates may be slidably disposed within ways formed by angle members 26 and have operating handles 28 connected thereto and pivotally connected to the body for sliding the gates 24 to either open or closed positions. It will thus be seen that the contents from each one of the separate hoppers or bins may be discharged by opening its gate 24.

In order to discharge the material, such as coal, sand, gravel or other materials, from the hoppers, a power driven conveyer mechanism, generally indicated at 30, is provided which is positioned under the hopper body so that it may be moved into registry with any one of the individual compartments and may be swung transversely of the vehicle to dispose the discharge end of the conveyer laterally of the body and at the desired level. Such discharge mechanism 30 includes an elongated frame formed of a plurality of longitudinally extending angle members 32 and 34 which are secured together to form a rigid frame by means of plate members 36 disposed on opposite sides of the frame and at each end thereof. The angle members 32 are disposed adjacent the top of the frame with the lower flanges thereof disposed inwardly to provide an upper runway for an endless conveyer belt 38 which may be formed of suitable material. The angle members 34 are similarly disposed adjacent the lower side of the frame to provide a lower runway for the belt 38.

The belt 38 is disposed about pulleys 40 which are pivotally mounted adjacent opposite ends of the frame. Each of such pulleys includes a tubular member 42 having transversely extending plate members 44 welded thereto and disposed inwardly of the ends thereof. Such plate members are provided with central openings therethrough which receive a shaft 46, which is fixed to the members 44 by welding. The ends of such shaft are journalled within ball bearing assemblies 48 which, in turn, are mounted within annular bearing supports 50. Such supports 50 project through openings in plate members 36 and are fixed thereto by means of nuts and bolts 52. An end plate 54 is secured over the outside face of one of such members and the shaft 46 projects through a plate member 56 which is secured to the opposite bearing frame. The pulley at one end of the frame is the driven pulley and at the opposite end may be an idler. At the idler end the shaft 46 does not project through a plate member such as at 56 but a plate member such as that shown at 54 is used on both ends of the pulley. It will therefore be understood that the shaft 46 at one end, including the projecting end portion 58, is the driving shaft for driving the belt 38 through its pulley 40.

Such projecting end 58 is keyed to a gear 60 which meshes with a pinion 62 keyed to a drive shaft 64. A fluid motor is used for driving the shaft 64 and such motor includes a housing 66 within which pump gears 68 and 70 are rotatably mounted in the usual way. Such gear pump may be of conventional construction; and the gear 70 is keyed to an idler shaft 72 which is mounted within the motor housing in the usual way. The gear 68 is keyed to the shaft 64 which is mounted on the fluid motor housing in the usual way. Suitable fluid, such as oil, is supplied to the inlet of the pump through a flexible conduit 74 and such fluid is discharged from the pump through a flexible return conduit 78.

Figure 1:
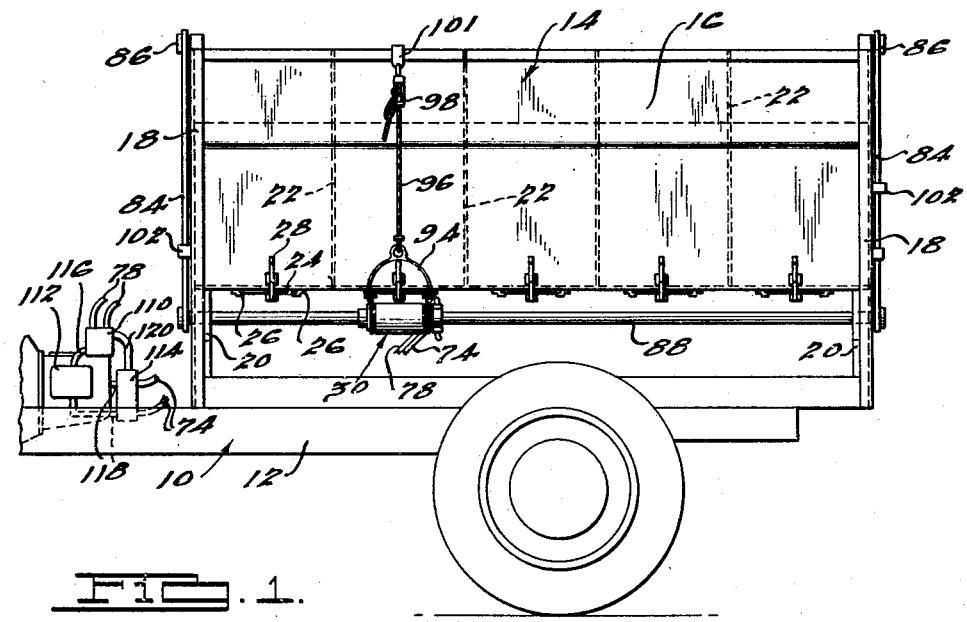
Figure 1 is a fragmentary side elevational view of an automotive vehicle having a hopper body and conveyer means, according to the present invention, associated therewith.

In certain uses only one of such conveyer sections 30 need be used, as shown in Figs. 1 and 2; but in other uses a plurality of such conveyer units 30 may be used as shown in Figs. 3 and 6. Such conveyer sections may be substantially identical in form except that the auxiliary sections have hooks 80 mounted adjacent one end thereof which are adapted to hook over pivot members 82 fixed to the discharge end of the main conveyer section, as shown in Figs. 3 and 6. The sections are so arranged that one of the sections discharges on to the next conveyer belt and the assembled sections provide a continuation of the preceding section in order to extend the position of the discharge of the load.

The main section 30 is swingably mounted under the body 14 so that it may be carried in the position shown in Fig. 2, but may be swung laterally of the body and moved longitudinally thereof to discharge the material from any one of the hoppers. Such mounting means includes depending arms 84. Such arms 84 are disposed at opposite ends of the body and are pivotally mounted to the top of the body by means of pivot pins 86. The lower ends of the arms are connected to the ends of a longitudinally extending shaft 88. The ends of such shaft 88 are received within guide grooves 90 formed in the plate members 80, such guide grooves serving as limits for the transverse swinging movement of the shaft 88. The shaft 88 extends through pivot openings 92 having reinforced hub portions formed in the plate members 36 so that one end of the frame of the conveyer section 30 is pivotally and slidably mounted on the shaft 88. The outer or discharge end of the frame 30 has a bale 94 connected thereto to which a rope or cable 96 is connected. The upper end of the cable 96 is trained through a suitable pulley 98 which is mounted to a hook member 101. Such hook member 101 may be slid along the top edge of one of the sides of the body and hooked at the desired location. The free end of the rope 96 may be pulled as desired to locate the height of the discharge end of section 30.

The conveyer section 30 is normally carried in the position shown in Fig. 2 and removable stops 102 may be positioned into the ends of the body to hold the arms 86 in such position. When the stops 102 are removed, the conveyer section is free to swing laterally of the body. It will thus be seen that the one end of the conveyer section 30 may be positioned over any one of the gates 25 by swinging such section laterally and moving it longitudinally of the body along the shaft 88. The discharge end of the conveyer section 30 is thus moved laterally of the body to deposit the material to the side of the body and such end may be given the desired height.

A plurality of such sections may be mounted together as shown in Figs. 3 and 6. In Fig. 3 the material being discharged is deposited over a curb or wall, while in Fig. 6 such material is raised to a substantial height and is deposited by the power conveyer sections 30 to a downwardly extending chute 108, which may be mounted on the projections 82 of the discharge end of the outermost conveyer section 30.

It will be appreciated that by being able to raise the discharge ends of the conveyer sections 30, as shown in Fig. 6, that a relatively rapid discharge down the chute 108 is accomplished.

Each of the conveyer sections is provided with a fluid motor for driving the belt and each of such motors has a power conduit 74 and a return conduit 78 associated therewith. The fluid under pressure for driving the fluid motors is supplied by conventional hydraulic power elements mounted on the truck 10 and driven from the power take off of the engine in the usual way. Such means includes a conventional tank or reservoir 110, a conventional pump 112, and a conventional control valve 114 which is preferably of the open center type.

The fluid is supplied to the pump 112 from the tank 110 through a conduit 116 and such fluid under pressure is supplied to the valve 114 through conduits 118. Conduits 74 supply the fluid to either one or both of the fluid motors depending upon the setting of the valve.

A return conduit 120 having the usual pressure relief valve associated therewith permits recirculation of the fluid to the pump and back to the tank in the event that the valve 114 is shut off to both of the motors. The fluid from the return line 78, from the motors, discharges into the tank 110 in the usual way.

Formal changes may be made in the specific embodiment of the invention described without departing from the spirit and substance of the invention, the scope of which is commensurate with the appended claims.

What is claimed is:

1. In a vehicle hopper body wherein a plurality of hopper compartments are provided and wherein each of such compartments has a discharge opening in the bottom thereof, the combination with said vehicle body of a power conveyer mechanism comprising an elongated frame disposed under said body and extending transversely thereof, a power driven belt conveyer mounted on said frame, power means for driving said belt mounted on said frame, and means movably mounting said frame on said body for moving one end of said conveyer under any one of said discharge openings and for moving the other end of said conveyer outwardly away from said body.

2. In a vehicle hopper body wherein a plurality of hopper compartments are provided and wherein each of such compartments has a discharge opening in the bottom thereof, the combination with said vehicle body of a power conveyer mechanism comprising an elongated frame, a power driven belt conveyer mounted on said frame, hydraulic power means for driving said belt mounted on said frame, and means movably mounting said frame on said body for moving one end of said conveyer under any one of said discharge openings and for moving the other end of said conveyer outwardly away from said body.

3. In a vehicle hopper body wherein a hopper compartment is provided and wherein such compartment has a discharge opening in the bottom thereof, the combination with said vehicle body of a power conveyer mechanism comprising an elongated frame disposed under said body and extending transversely thereof, a power driven belt conveyer mounted on said frame, power means for driving said belt mounted on said frame, mounting means connected to said body and engaging the ends of said frame for swingably mounting said frame under said body transversely thereof and for moving one end of said conveyer under said discharge opening and for moving the other end of said conveyer outwardly away from said body.

4. In a vehicle hopper body wherein a hopper compartment is provided and wherein such compartment has a discharge opening in the bottom thereof, the combination with said vehicle body of a power conveyer mechanism comprising an elongated frame disposed under said body and extending transversely thereof, a power driven belt conveyer mounted on said frame and extending between the ends thereof, power means for driving said belt mounted on said frame, mounting means connected to said body and engaging the ends of said frame for swingably mounting said frame under said body transversely thereof and for moving one end of said conveyer under said discharge opening and for moving the other end of said conveyer outwardly away from said body, said last named means including adjustable means for varying the relative heights of the ends of the frame with respect to each other.

5. In a vehicle hopper body wherein a plurality of hopper compartments are provided and wherein each of such compartments has a discharge opening in the bottom thereof, the combination with said vehicle body of a power conveyer mechanism comprising an elongated frame disposed under said body and extending transversely thereof, a power driven belt conveyer mounted on said frame, power means for driving said belt mounted on said frame, and means movably mounting said frame on said body for movement longitudinally of said body into co-operative relation with any one of said discharge openings and for transverse movement with respect to said body to move the discharge end of said conveyer outwardly away from said body.

6. In a vehicle hopper body wherein a plurality of hopper compartments are provided and wherein each of such compartments has a discharge opening in the bottom thereof, the combination with said vehicle body of a power conveyer mechanism comprising an elongated frame disposed under said body and extending transversely thereof, a power driven belt conveyer mounted on said frame, power means for driving said belt mounted on said frame, and means movably mounting said frame on said body for movement longitudinally of said body into co-operative relation with any one of said discharge openings and for transverse movement with respect to said body to move the discharge end of said conveyer outwardly away from said body, said last named means including an adjustable means engaging the discharge end of said frame for varying the height of said discharge end with respect to the height of the opposite end of said frame.

7. In a vehicle hopper body wherein a plurality of hopper compartments are provided and wherein each of such compartments has a discharge opening in the bottom thereof, the combination with said vehicle body of a power conveyer mechanism comprising an elongated frame, a power driven belt conveyer mounted on said frame, power means for driving said belt mounted on said frame, and means movably mounting said frame on said body for movement into co-operative relation with any one of said discharge openings, said last named means including a longitudinally extending pivot shaft disposed under said body, means mounted on said body for swingably mounting said shaft, means pivotally connecting one end of said frame to said shaft for longitudinal sliding movement therealong, and adjustable means movable along the length of the body and engaging the opposite end of said frame.

8. In a vehicle hopper body wherein a plurality of hopper compartments are provided and wherein each of such compartments has a discharge opening in the bottom thereof, the combination with said vehicle body of a conveyer mechanism comprising an elongated frame disposed under said body and extending transversely thereof, a belt conveyer mounted on said frame, means for driving said belt, and means movably mounting said frame on said body for movement longitudinally of said body into cooperative relationship with any one of said discharge openings and for transverse movement with respect to said body to move the discharge end of said conveyer outwardly away from said body.

EDWARD R. BARRETT.